United States Patent

Siegel et al.

Patent Number: 5,276,148
Date of Patent: Jan. 4, 1994

[54] PHENYLAZOBENZENES OR NAPHTHYLAZOBENZENES HAVING A PLURALITY OF FIBER-REACTIVE GROUPS

[75] Inventors: Bernd Siegel, Ludwigshafen; Manfred Patsch, Wachenheim, both of Fed. Rep. of Germany

[73] Assignee: BASF Aktiengesellschaft, Ludwigshafen, Fed. Rep. of Germany

[21] Appl. No.: 886,835

[22] Filed: May 22, 1992

[30] Foreign Application Priority Data

May 23, 1991 [DE] Fed. Rep. of Germany ....... 4116785

[51] Int. Cl.$^5$ ................... C09B 62/006; C09B 62/507; D06P 1/38
[52] U.S. Cl. ..................................... 534/605; 534/612; 534/632; 534/633; 534/635; 534/637; 534/638; 534/642; 534/643
[58] Field of Search ............... 534/605, 612, 632, 633, 534/635, 637, 638, 643

[56] References Cited

U.S. PATENT DOCUMENTS

| | | | |
|---|---|---|---|
| 4,841,028 | 6/1989 | Aeschilmann et al. | 534/638 X |
| 4,855,411 | 8/1989 | Thompson et al. | 534/629 |
| 5,091,516 | 2/1992 | Siegel et al. | 534/638 X |

FOREIGN PATENT DOCUMENTS

| | | |
|---|---|---|
| 0265857 | 5/1988 | European Pat. Off. |
| 0407871 | 1/1991 | European Pat. Off. |
| 0437669 | 7/1991 | European Pat. Off. |
| 0174909 | 10/1991 | European Pat. Off. |

Primary Examiner—Mary C. Lee
Assistant Examiner—Fiona T. Powers
Attorney, Agent, or Firm—Oblon, Spivak, McClelland, Maier & Neustadt

[57] ABSTRACT

Reactive dyes of the formula

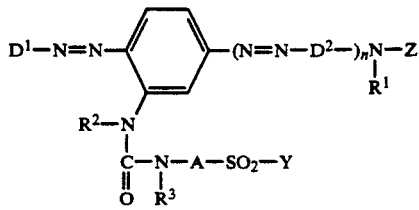

where
n is 0 or 1,
$R^1$, $R^2$ and $R^3$ are each hydrogen, $C_1$-$C_4$-alkyl or phenyl,
A is unsubstituted or substituted $C_2$-$C_8$-alkylene,
Y is vinyl or a radical of the formula —$CH_2$—$CH_2$—Q, where
Q is a group which can be eliminated under alkaline reaction conditions,
$D^1$ is phenyl or naphthyl, where these radicals may be substituted,
$D^2$ is phenylene or naphthylene, where these radicals may be substituted, and
Z is a reactive radical,
with the proviso that
a) n is zero when $D^1$ is substituted by unsubstituted or substituted phenylazo or by unsubstituted or substituted naphthylazo and
b) the reactive radical Z is not devised from the triazine series when n is zero and $D^1$ is dihydroxysulfonylphenyl or trihydroxysulfonylnaphthyl, are used for dyeing and printing organic substrates containing hydroxyl groups or nitrogen atoms.

4 Claims, No Drawings

PHENYLAZOBENZENES OR NAPHTHYLAZOBENZENES HAVING A PLURALITY OF FIBER-REACTIVE GROUPS

The present invention relates to novel reactive dyes of the formula I

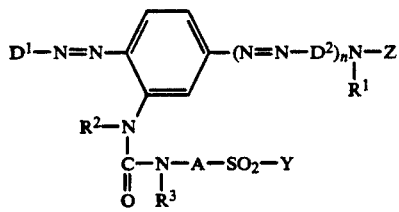

where n is 0 or 1, $R^1$, $R^2$ and $R^3$ are identical or different and, independently of one another, are each hydrogen, $C_1-C_4$-alkyl or phenyl, A is $C_2-C_8$-alkylene which may be interrupted by from 1 to 3 oxygen atoms, imino groups or $C_1-C_4$-alkylimino groups, Y is vinyl or a radical of the formula —$CH_2$—$CH_2$—Q, where Q is a group which can be eliminated under alkaline reaction conditions, $D^1$ is phenyl or naphthyl, where these radicals may be monosubstituted or polysubstituted by hydroxysulfonyl, carboxyl, $C_1-C_4$-alkoxycarbonyl, cyano, $C_1-C_4$-alkyl, $C_1-C_4$-alkoxy, halogen, nitro or vinylsulfonyl or monosubstituted by unsubstituted or substituted phenylazo or by unsubstituted or substituted naphthylazo, $D^1$ is unsubstituted or substituted phenylene or unsubstituted or substituted naphthylene and Z is a reactive radical, with the proviso that a) n is zero when $D^1$ is substituted by unsubstituted or substituted phenylazo or by unsubstituted or substituted naphthylazo, and b) the reactive radical Z is not derived from the triazine series when n is zero and $D^1$ is dihydroxysulfonylphenyl or trihydroxysulfonylnaphthyl, and the use of the novel dyes for dyeing or printing fibers having hydroxyl groups or nitrogen atoms.

EP-A No. 174 909 discloses reactive dyes which contain the vinylsulfonyl radical as a reactive group, this radical being bonded to the dye radical via the ureido group.

Dyes of the formula I where n is zero, $D^1$ is dihydroxysulfonylphenyl or trihydroxysulfonylnaphthyl and Z is a reactive radical from the triazine series are described in the prior Patent Application EP-A No. 437 669.

It is an object of the present invention to provide novel reactive dyes which likewise have a vinyl-sulfonyl group which is bonded to the chromophore via a ureido group, and the novel dyes should have advantageous performance characteristics.

We have found that this object is achieved by the reactive dyes of the formula I which were defined at the outset.

All alkyl and alkylene groups occurring in the abovementioned formula I may be both straight-chain and branched.

$R^1$, $R^2$ and $R^3$ are, for example, methyl, ethyl, propyl, isopropyl, butyl, isobutyl or sec-butyl.

A is, for example, —$(CH_2)_2$—, —$(CH_2)_3$—, —$(CH_2)_4$—, $CH_2)_5$—, —$(CH_2)_6$—, —$(CH_2)_7$—, —$(CH_2)_8$—, —$CH(CH_3)$—$CH_2$—, —$CH(CH_3)$—$CH(CH_3)$—$(CH_2)_2$—$O$—$(CH_2)_2$—, —$(CH_2)_2$—$NH$—$(CH_2)_2$, $(CH_2)_2$—$N(CH_3)$—$(CH_2)_2$—, —$(CH_2)_2$—$O$—$(CH_2)_2$—$O$—$(CH_2)_2$— or —$(CH_2O$—$(CH_2)_2$—$O$—$(CH_2)_2$—$O$—$(CH_2)_2$—.

In formula I, Y is, inter alia, a group which can be eliminated under alkaline reaction conditions. Examples of such groups are chlorine, $OSO_3H$, $SSO_3H$, $OP(O)(OH)_2$, $C_1-C_4$-alkylsulfonyloxy, phenylsulfonyloxy, $C_1-C_4$-alkanoyloxy, $C_1-C_4$-dialkylamino,

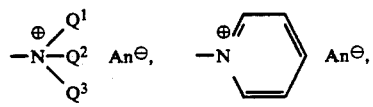

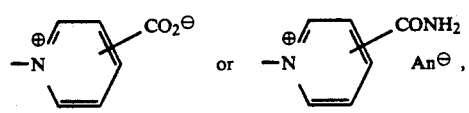

where $Q^1$, $Q^2$ and $Q^3$ are identical or different and, independently of one another, are each $C_1-C_4$-alkyl or benzyl and An⊖ in each case is an anion. (Examples of suitable anions are fluoride, chloride, bromide, iodide, mono-, di- or trichloroacetate, methanesulfonate, benzenesulfonate or 2- or 4-methylbenzenesulfonate.)

When $D^1$ is phenyl or naphthyl which is monosubstituted by substituted phenylazo or substituted naphthylazo, or when $D^2$ is substituted phenylene or substituted naphthylene, suitable substituents f or this purpose are hydroxysulfonyl or the radical —$NR^2$—$CO$—$NR^3$—$A$—$SO_2$—Y, where $R^2$, $R^3$, A and Y each have the abovementioned meaning. The phenyl nuclei are as a rule monosubstituted or disubstituted by hydroxysulfonyl or monosubstituted by the radical —$NR^2$—$CO$—$NR^3$—$A$—$SO_2$—$A$, and the naphthyl nuclei are monosubstituted to trisubstituted by hydroxysulfonyl or monosubstituted by the radical —$NR^2$—$CO$—$NR^3$—$A$—$SO_2$—Y.

$D^1$ is, for example, 2,4-dihydroxysulfonylphenyl, 2,5-dihydroxysulfonylphenyl, 2,5-dihydroxysulfonyl-4-methylphenyl, 2,5-dihydroxysulfonyl-6-chlorophenyl, 3,6,8-trihydroxysulfonylnaphth-2-yl, 4,6,8-trihydroxysulfonylnaphth-2-yl, 1,5-dihydroxysulfonylnaphth-2-yl or 1,6-dihydroxysulfonylnaphth-2-yl.

Reactive radicals Z are derived, for example, from the heterocyclic or the aliphatic series.

Suitable reactive radicals Z are, for example, of the formula

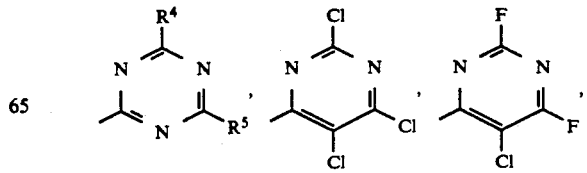

-continued
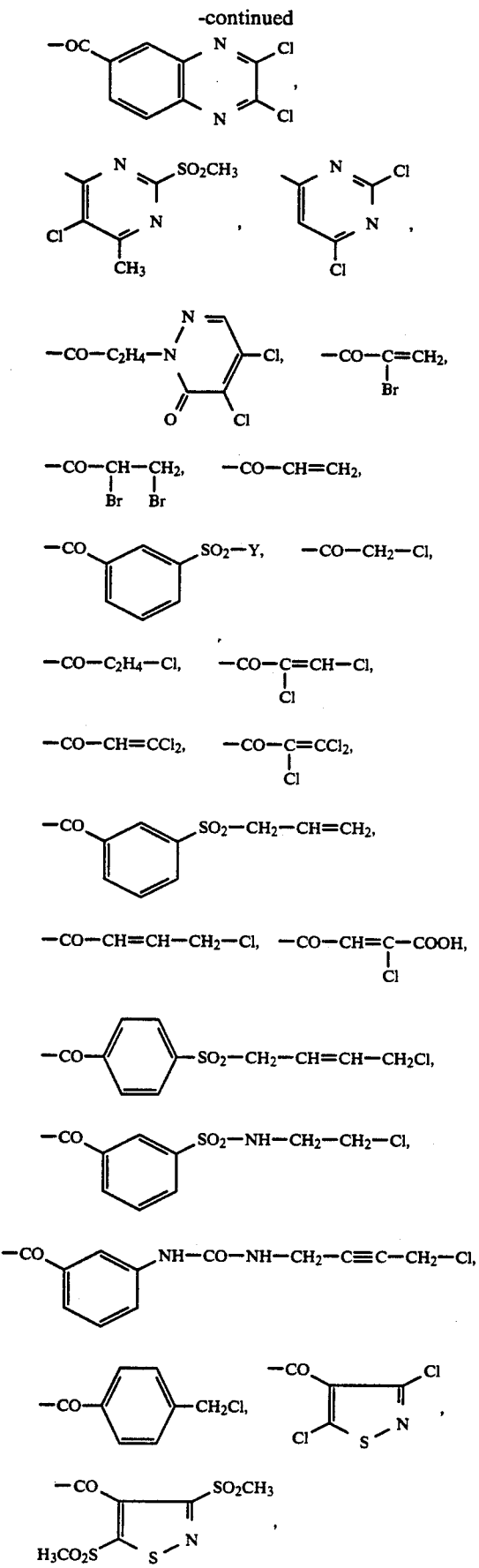
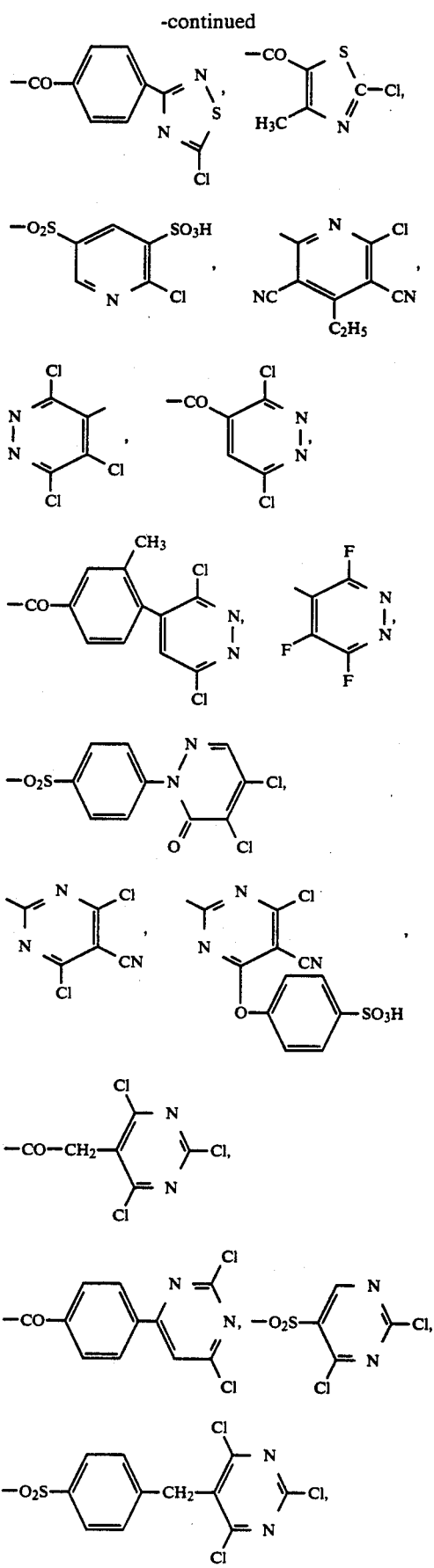

-continued

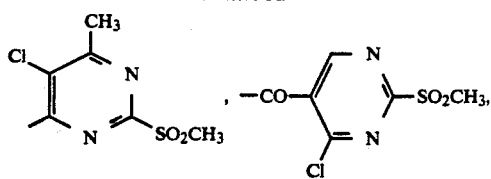

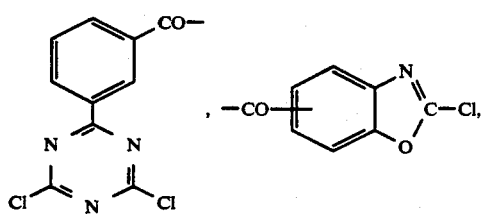

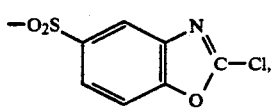

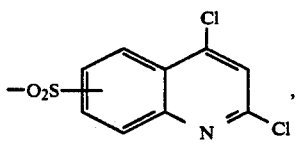

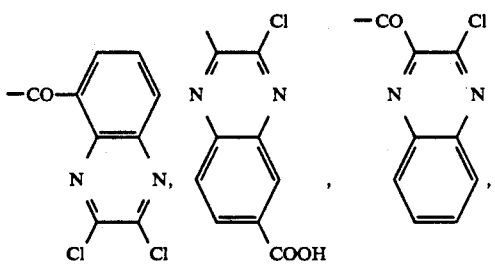

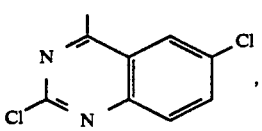

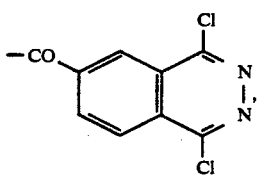

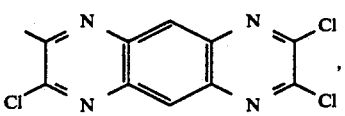

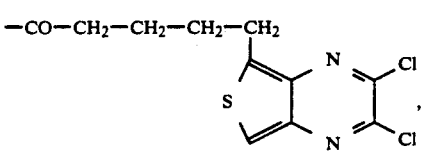

-continued

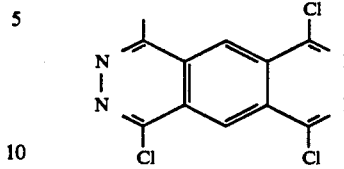
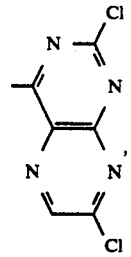

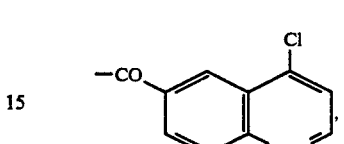

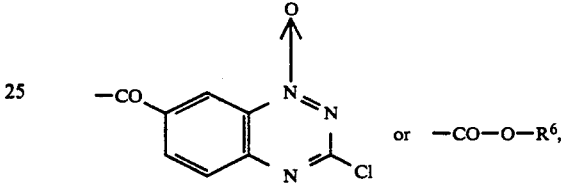 or —CO—O—R$^6$, where

R$^4$ is C$_1$–C$_4$-alkoxy, phenoxy or a radical of the formula NL$^1$L$^2$ where L$^1$ and L$^2$ are identical or different and, independently of one another, are each C$_1$–C$_4$-alkyl, which is unsubstituted or substituted by hydroxyl, hydroxysulfonyl or sulfato, or unsubstituted or substituted phenyl, or L$^1$ and L$^2$, together with the nitrogen atom binding them, form a 5-membered or 6-membered saturated heterocyclic radical which may contain further hetero atoms, or L$^1$ is also hydrogen, R$^5$ is fluorine, chlorine, bromine, C$_1$–C$_4$-alkylsulfonyl, phenylsulfonyl or a radical of the formula

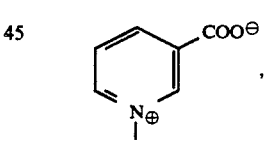

and

R$^6$ is a radical of the formula —OCH$_2$CCl$_3$, —OCH$_2$—CBr=CH$_2$, —OCH$_2$—CCl=CHCl, —OCH$_2$—C≡CH, —OC$_2$H$_4$—N$^⊕$(CH$_3$)$_3$Cl$^⊖$ or —SCH$_2$—COOH and Y has the abovementioned meanings.

If substituted phenyl radicals occur in R$^4$, examples of suitable substituents are C$_1$–C$_4$-alkyl, C$_1$–C$_4$-haloalkyl, C$_1$–C$_4$-alkoxy, C-imino, C$_1$–C$_4$-mono- or dialkylamino, nitro, formyl, cyano, carboxyl or hydroxysulfonyl.

R$^4$ is, for example, methoxy, ethoxy, propoxy, isopropoxy, butoxy, isobutoxy, sec-butoxy, mono- or dimethylamino, mono- or diethylamino, mono- or dipropylamino, mono- or diisopropylamino, mono- or dibutylamino, N-methyl-N-ethylamino, N-(2-hydroxyethyl)-amino, N-(2-hydroxysulfonylethyl)-amino, N-(2-sulfatoethyl)-amino, mono- or diphenylamino, N-methyl-N-phenylamino, N-ethyl-N-phenylamino, N-propyl-N-phenylamino, N-isopropyl-N-phenylamino, N-butyl-N-phenylamino, 2- or 4-methylphenylamino, N-methyl-N-(2- or 4-methylphenyl)-amino, N-ethyl-N-(2- or 4-methylphenyl)-amino, 2- or 4-chloromethylphenylamino, N-methyl-N-(2- or 4-chloromethylphenyl)amino, N-ethyl-N-(2- or 4-chloromethylphenyl)-amino, 2- or 4-trifluoromethylphenylamino, N-methyl-N-(2- or 4-trifluoromethylphenyl)-amino, N-ethyl-N-(2- or 4-trifluoromethylphenyl)-amino, 2-methoxyphenylamino, N-methyl-N-(2-methoxyphenyl)-amino, N-ethyl-N-(2-methoxyphenyl)-amino, 2-aminophenylamino, N-methyl-N-(2-aminophenyl)-amino, N-ethyl-N- (2-aminophenyl) -amino, 2-methylaminophenylamino, N-methyl-N-(2-methylaminophenyl)-amino, N-ethyl-N-(2-methylaminophenyl)-amino, 2-dimethylaminophenylamino, N-methyl-N- (2-dimethylaminophenyl) -amino, N-ethyl-N-(2-dimethylaminophenyl)-amino, 3-nitrophenylamino, N-methyl-N-(3-nitrophenyl)-amino, N-ethyl-N-(3-nitrophenyl)-amino, 3-cyanophenylamino, N-methyl-N-(3-cyanophenyl)-amino, N-ethyl-N-(3-cyanophenyl)-amino, 3-formylphenylamino, N-methyl-N-(3-formylphenyl)-amino, N-ethyl-N-(3-formylphenyl)-amino, 3-carboxyphenylamino, N-methyl-N-(3-carboxyphenyl)-amino, N-ethyl-N-(3-carboxyphenyl)-amino, 3-hydroxysulfonylphenylamino, N-methyl-N-(3-hydroxysulfonylphenyl)-amino, N-ethyl-N-(3-hydroxysulfonylphenyl)-amino, pyrrolidino, piperidino, morpholino, piperazino or N-($C_1$-$C_4$-alkyl)-piperazino.

$R^5$ is, for example, methylsulfonyl, ethylsulfonyl, propylsulfonyl, isopropylsulfonyl or butysulfonyl.

Preferred reactive dyes of the formula I are those in which n is zero, $R^1$, $R^2$ and $R^3$ are each hydrogen, A is $C_2$-$C_4$-alkylene which may be interrupted by an oxygen atom and $D^1$ is phenyl or naphthyl, where these radicals are mono-substituted to trisubstituted by hydroxysulfonyl.

Other preferred reactive dyes of the formula I are those in which Z is a radical from the pyrazine, pyrimidine, quinoxaline, triazine, vinylsulfonyl or acryloyl series.

When n is 1 or when $D^1$ is not dihydroxysulfonyl or trihydroxysulfonylnaphthyl, particularly noteworthy reactive dyes of the formula I are those in which Z is a radical of the formula

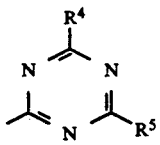

where $R^4$ and $R^5$ each have the abovementioned meanings. In particular, the following dyes may be mentioned, in which $R^4$ is a radical of the formula $NL^1L^2$, where $L^1$ is $C_1$-$C_4$ alkyl and $L^2$ is substituted phenyl or in particular unsubstituted phenyl, and $R^5$ is fluorine or chlorine.

Particularly preferred reactive dyes of the formula I are those in which $D^1$ is dihydroxysulfonylphenyl or trihydroxysulfonylnaphthyl.

The novel reactive dyes of the formula I (where n is 0) are obtained in an advantageous manner if, for example, an amine of the formula II

where $D^1$ has the abovementioned meanings, is diazotized in a conventional manner and the product is coupled to a phenylenediamine of the formula III

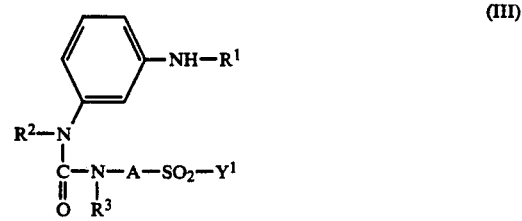

where $R^1$, $R^2$, $R^3$ and A each have the abovementioned meaning and $Y^1$ is 2-hydroxyethyl or the radical Y.

The resulting azo dye of the formula IV

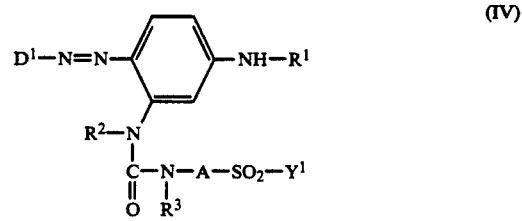

where $D^1$, $R^1$, $R^2$, $R^3$, A and $Y^1$ each have the abovementioned meanings, can then be reacted in a known manner with a compound of the formula V

where Z has the abovementioned meanings and Hal is fluorine or chlorine.

The novel reactive dyes of the formula I where n is 1 can be prepared, for example, by diazotizing an azo dye of the formula IVa

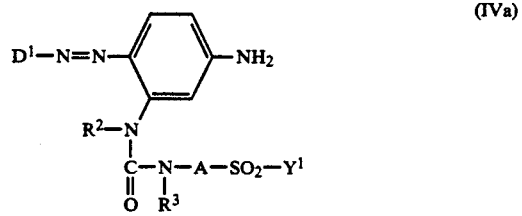

where $D^1$, $R^2$, $R^3$ A and $Y^1$ each have the abovementioned meanings, which dye can be obtained as described above, and coupling the product to an amine derivative of the formula VI

where $R^1$ and $D^2$ each have the abovementioned meanings, and reacting the product, as described above, with a compound of the formula V.

The phenylenediamines of the formula III are prepared in a conventional manner, as described in, for example, the prior Patent Application EP-A No. 437

669 or in the prior German Patent Application P 41 07 692.3.

Where $Y^1$ is 2-hydroxyethyl, the latter is finally converted into the radical Y, likewise in a conventional manner, for example by esterification with sulfuric acid.

The novel reactive dyes of the formula I can advantageously be used for dyeing or printing organic substrates having hydroxyl groups or nitrogen atoms. Examples of such substrates are leather or fiber material which contains predominantly natural or synthetic polyamides or natural or regenerated cellulose. The novel dyes are preferably used for dyeing and printing textile material based on cotton. The novel reactive dyes can also be employed for discharge printing since they can be discharged under alkaline conditions.

The Examples which follow illustrate the invention. The phenylenediamines used therein as coupling components are described in the prior Patent Application EP-A No. 437 669 under Examples 5 to 8, and in the prior German Patent Application P 41 07 692.3, under Examples Z4 to Z9.

EXAMPLE 1

101.2 g (0.4 mol) of aniline-2,4-disulfonic acid were diazotized in 400 ml of water containing hydrochloric acid, and the product was added to a suspension of 132 g (0.4 mol) of the compound of the formula

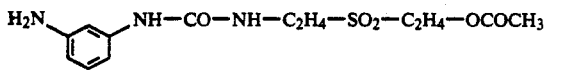

in 500 ml of water. The coupling reaction was carried out at from 0° to 50° C. and at a pH of 3 by adding 2 N potassium bicarbonate solution. The reaction solution described above was subjected to a condensation reaction with 88 g (0.4 mol) of tetrachloropyrimidine at from 30° to 450° C. and at a pH of from 6 to 7. The solution was then clarified by filtration and the reactive dye was isolated by salting out. It is of the formula (free acid)

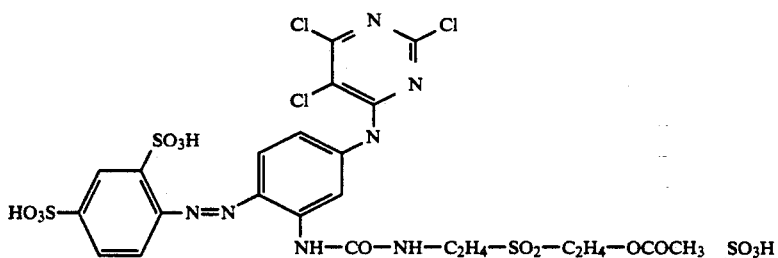

and dyes cotton in a yellow hue with good lightfastness and fastness to wet treatments.

The dyes of the formula

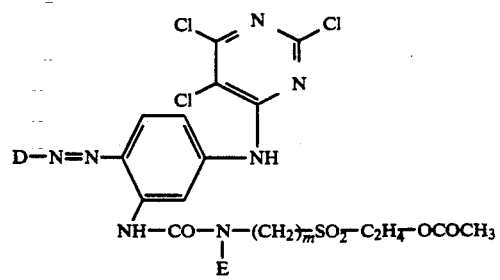

which are described in Table 1 can be obtained in a similar manner.

TABLE 1

| Ex. no. | D | E | m | Hue on cotton |
|---|---|---|---|---|
| 2 | ![2-SO3H, 4-HO3S phenyl] | H | 2 | yellow |
| 3 | ![2-SO3H, 4-O3S phenyl] | H | 3 | yellow |
| 4 | ![2-SO3H, 4-HO3S phenyl] | CH₃ | 2 | yellow |
| 5 | — | H | 3 | yellow |
| 6 | ![2-SO3H, 4-HO3S phenyl] | CH₃ | 2 | yellow |

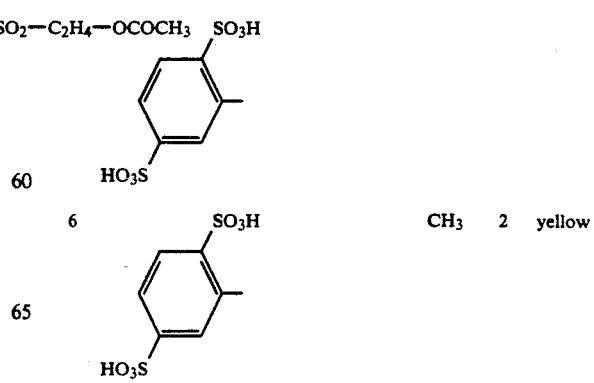

TABLE 1-continued

| Ex. no. | D | E | m | Hue on cotton |
|---|---|---|---|---|
| 7 | 2,7-disubstituted naphthalene with SO₃H at 1 and 5 positions (1,5-disulfo-7-methyl... naphthalene linkage) | H | 2 | yellow |
| 8 | same as Ex. 7 | H | 3 | yellow |
| 9 | same as Ex. 7 | CH₃ | 2 | yellow |
| 10 | naphthalene with SO₃H at 1, HO₃S at 6, and SO₃H at 7 (linkage at 3-position) | H | 2 | reddish yellow |
| 11 | same as Ex. 10 | H | 3 | reddish yellow |
| 12 | naphthalene with SO₃H at 1, HO₃S at 6, SO₃H at 5 | CH₃ | 2 | reddish yellow |
| 13 | same as Ex. 12 | CH₃ | 2 | reddish yellow |
| 14 | same as Ex. 12 | H | 3 | reddish yellow |
| 15 | same as Ex. 12 | CH₃ | 2 | reddish yellow |
| 16 | benzene with SO₃H, CH₃, HO₃S substituents | H | 2 | yellow |
| 17 | same as Ex. 16 | H | 3 | yellow |
| 18 | same as Ex. 16 | CH₃ | 2 | yellow |
| 19 | benzene with Cl, HO₃S, SO₃H substituents | H | 2 | yellow |
| 20 | same as Ex. 19 | H | 3 | yellow |
| 21 | same as Ex. 19 | CH₃ | 2 | yellow |

EXAMPLE 22

101.2 g (0.4 mol) of aniline-2,5-disulfonic acid were diazotized in 400 ml of water containing hydrochloric acid, and the product was added to a suspension of 132 g (0.4 mol) of the compound of the formula

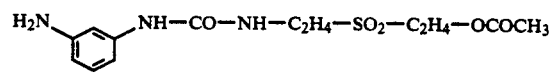

in 500 ml of water. The coupling reaction was carried out at from 0° to 5° C. and at a pH of 3 by means of 2 N potassium bicarbonate solution. The reaction solution described above was subjected to a condensation reaction with 67.4 g (0.4 mol) of 2,4,6-trifluoro-5-chloropyrimidine at from 0° to 50° C. and at a pH of from 6 to 7. The solution was then clarified by filtration and the reactive dye was isolated by spray drying. It is of the formula (free acid)

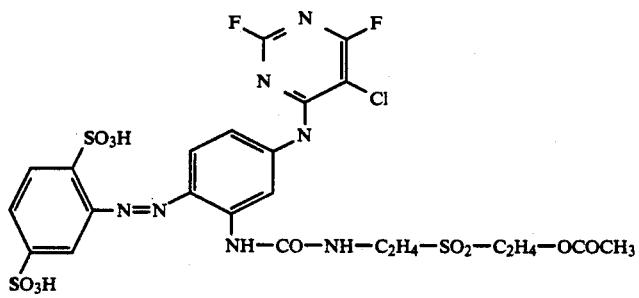

and dyes cotton in a yellow hue with good lightfastness and fastness to wet treatments.

The dyes of the formula

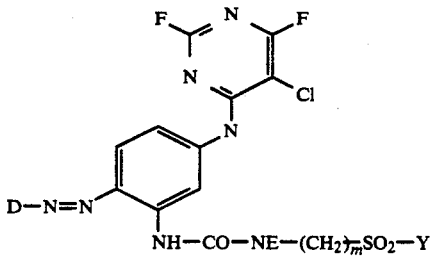

which are described in Table 2 can be obtained in a similar manner.

TABLE 2

| Ex. no. | D | E | m | Y | Hue on cotton |
|---|---|---|---|---|---|
| 23 | 2,5-disulfophenyl (SO3H ortho, HO3S para) | H | 2 | $C_2H_4OCOCH_3$ | yellow |
| 24 | 2,5-disulfophenyl | $CH_3$ | 2 | $C_2H_4OCOCH_3$ | yellow |
| 25 | 2,5-disulfophenyl | H | 3 | $C_2H_4OCOCH_3$ | yellow |
| 26 | 2,4-disulfophenyl | H | 3 | $C_2H_4OCOCH_3$ | yellow |
| 27 | 2,4-disulfophenyl | $CH_3$ | 2 | $C_2H_4OCOCH_3$ | yellow |
| 28 | 2,5-disulfophenyl | H | 2 | $CH=CH_2$ | yellow |

TABLE 2-continued

| Ex. no. | D | E | m | Y | Hue on cotton |
|---|---|---|---|---|---|
| 29 | 2,4-disulfo-phenyl (SO₃H at 1, HO₃S at 4, methyl position) | H | 2 | CH=CH₂ | yellow |
| 30 | disulfo-methylphenyl | H | 2 | C₂H₄Cl | yellow |
| 31 | disulfo-methylphenyl | H | 2 | C₂H₄Cl | yellow |
| 32 | trisulfo-methylnaphthyl | H | 2 | C₂H₄OCOCH₃ | yellow |
| 33 | trisulfo-methylnaphthyl | H | 2 | CH=CH₂ | yellow |
| 34 | trisulfo-methylnaphthyl | H | 2 | C₂H₄Cl | yellow |
| 35 | trisulfo-methylnaphthyl | H | 2 | C₂H₄OCOCH₃ | yellow |
| 36 | trisulfo-methylnaphthyl | H | 2 | C₂H₄Cl | yellow |
| 37 | trisulfo-methylnaphthyl | H | 2 | CH=CH₂ | yellow |

TABLE 2-continued

| Ex. no. | D | E | m | Y | Hue on cotton |
|---|---|---|---|---|---|
| 38 | naphthalene with SO₃H (1-position) and SO₃H (5-position), methyl at 7-position | H | 2 | $C_2H_4OCOCH_3$ | yellow |
| 39 | naphthalene with SO₃H (1-position) and SO₃H (5-position), methyl at 7-position | H | 2 | $CH=CH_2$ | yellow |
| 40 | naphthalene with SO₃H (1-position) and SO₃H (5-position), methyl at 7-position | H | 2 | $C_2H_4Cl$ | yellow |
| 41 | benzene with SO₃H, SO₃H, CH₃ and H₃C substituents | H | 2 | $C_2H_4OCOCH_3$ | yellow |
| 42 | benzene with SO₃H, SO₃H, CH₃ and H₃C substituents | H | 2 | $CH=CH$ | yellow |
| 43 | benzene with SO₃H, SO₃H, CH₃ and H₃C substituents | H | 2 | $C_2H_4Cl$ | yellow |
| 44 | benzene with Cl, SO₃H, SO₃H substituents | H | 2 | $C_2H_4OCOCH_3$ | yellow |
| 45 | benzene with Cl, SO₃H, SO₃H substituents | H | 2 | $CH=CH$ | yellow |

TABLE 2-continued

| Ex. no. | D | E | m | Y | Hue on cotton |
|---|---|---|---|---|---|
| 46 | 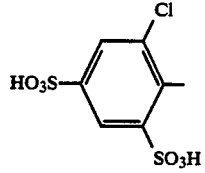 | H | 2 | C$_2$H$_4$Cl | yellow |

EXAMPLE 47

0.5 mol of the coupling solution described in Example 1 was subjected to a condensation reaction with 91.8 g (0.5 mol) of 2,4,6-trichloropyrimidine at from 40° to 60° C. and at a pH of from 6 to 7. The resulting reaction solution was clarified by filtration and the reactive dye was isolated by salting out. It is of the formula (free acid)

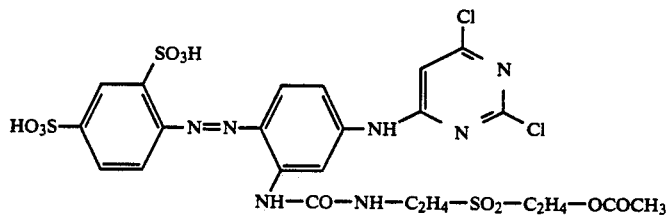

and dyes cotton in a yellow hue.

The dyes of the formula

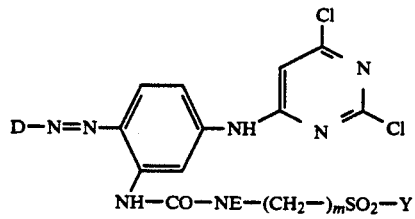

which are shown in Table 3 were obtained in a similar manner.

TABLE 3

| Ex. no. | D | E | m | Y | Hue on cotton |
|---|---|---|---|---|---|
| 48 | (benzene with SO$_3$H, CH$_3$, HO$_3$S) | H | 2 | C$_2$H$_4$OCOCH$_3$ | yellow |
| 49 | (naphthalene with SO$_3$H, SO$_3$H) | H | 2 | C$_2$H$_4$OCOCH$_3$ | yellow |
| 50 | (naphthalene with SO$_3$H, HO$_3$S, SO$_3$H) | CH$_3$ | 2 | C$_2$H$_4$Cl | yellow |
| 51 | 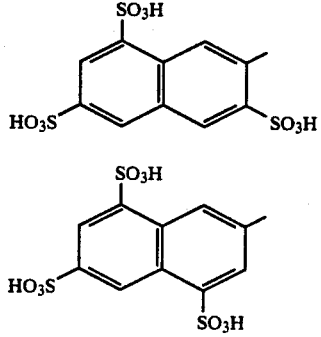 | H | 3 | C$_2$H$_4$OCOCH$_3$ | yellow |

TABLE 3-continued

| Ex. no. | D | E | m | Y | Hue on cotton |
|---|---|---|---|---|---|
| 52 | H3C—[benzene with SO3H, SO3H (HO3S)]— | H | 2 | CH=CH2 | yellow |
| 53 | HO3S—[benzene with Cl, SO3H]— | CH3 | 2 | C2H4Cl | yellow |

EXAMPLE 54

191.5 g (0.5 mol) of 2-aminonaphthalene-3,6,8-trisulfonic acid were diazotized in 500 ml of water containing hydrochloric acid and the product was added to a suspension of 164.5 g (0.5 mol) of the compound of the formula

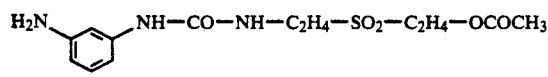

in 600 ml of water. The coupling reaction was carried out at from 0° to 50° C. and at a pH of from 2 to 3. The resulting reaction solution was subjected to a condensation reaction with 127.8 g (0.5 mol) of 4,5-dichloro-1-(2-chlorocarbonylethyl)-pyridaz-6-one at from 20° to 30° C. and at a pH of from 6 to 7. The resulting dye solution was clarified by filtration and the reactive dye of the formula (free acid)

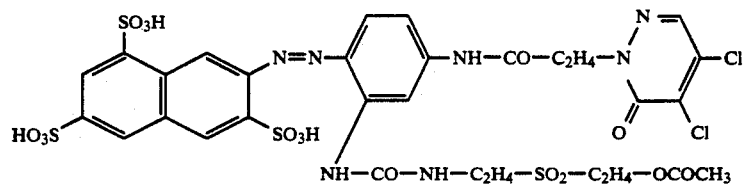

was isolated by spray drying. It dyes cotton in a yellow hue with good lightfastness and fastness to wet treatments.

The dyes of the formula

D—N=N—[benzene with NH—CO—NE—(CH2—)$_m$SO2—Y]—NH—CO—C2H4—N[pyridazinone with Cl, Cl]

which are shown in Table 4 can be obtained in a similar manner.

TABLE 4

| Ex. no. | D | E | m | Y | Hue on cotton |
|---|---|---|---|---|---|
| 55 | [naphthalene with SO3H, HO3S, SO3H] | CH3 | 2 | C2H4OCOCH3 | yellow |
| 56 | [naphthalene with SO3H, HO3S, SO3H] | H | 3 | C2H4OCOCH3 | yellow |
| 57 | [naphthalene with SO3H, HO3S, SO3H] | H | 2 | C2H4OCOCH3 | yellow |

TABLE 4-continued

| Ex. no. | D | E | m | Y | Hue on cotton |
|---|---|---|---|---|---|
| 58 | naphthalene with SO₃H, HO₃S, SO₃H | H | 2 | C₂H₄Cl | yellow |
| 59 | naphthalene with SO₃H, HO₃S, SO₃H | H | 2 | CH=CH₂ | yellow |
| 60 | naphthalene with SO₃H, SO₃H | H | 2 | C₂H₄OCOCH₃ | yellow |
| 61 | naphthalene with SO₃H, SO₃H | H | 2 | C₂H₄OCOCH₃ | yellow |
| 62 | benzene with SO₃H, HO₃S | H | 2 | C₂H₄OCOCH₃ | yellow |
| 63 | benzene with SO₃H, HO₃S | H | 2 | C₂H₄Cl | yellow |
| 64 | benzene with SO₃H, HO₃S | H | 2 | C₂H₄OCOCH₃ | yellow |
| 65 | benzene with SO₃H, HO₃S | H | 2 | CH=CH₂ | yellow |
| 66 | benzene with SO₃H, H₃C, HO₃S | H | 2 | C₂H₄OCOCH₃ | yellow |

TABLE 4-continued

| Ex. no. | D | E | m | Y | Hue on cotton |
|---|---|---|---|---|---|
| 67 | ![3,5-disulfo-4-chlorophenyl] | H | 2 | $C_2H_4OCOCH_3$ | yellow |
| 68 | ![3,5-disulfo-4-chlorophenyl] | H | 3 | $C_2H_4OCOCH_3$ | yellow |
| 69 | ![3,5-disulfo-4-chlorophenyl] | $CH_3$ | 2 | $C_2H_4OCOCH_3$ | yellow |

EXAMPLE 70

126.5 g (0.5 mol) of aniline-2,4-disulfonic acid were diaiotized in 500 ml of water containing hydrochloric acid, and the product was added to a suspension of 164.5 g (0.5 mol) of the compound of the formula

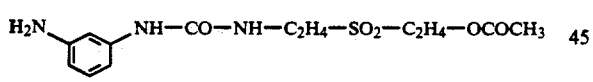

in 500 ml of water. The coupling reaction was carried out at from 0° to 50° C. and at a pH of 3. This reaction solution was subjected to a condensation reaction with 130.8 g (0.5 mol) of 2,3-dichloroquinoxaline-6-carbonyl chloride at from 20° to 35° C. and at a pH of from 6 to 7. The resulting dye solution was clarified by filtration and the reactive dye of the formula (free acid)

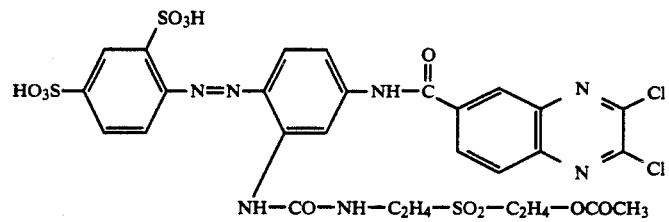

was isolated by spray drying. It dyes cotton in a yellow hue.

The dyes of the formula

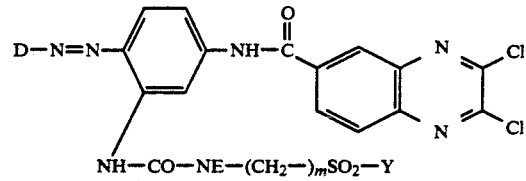

which are shown in Table 5 can be obtained in a similar manner.

TABLE 5

| Ex. no. | D | E | m | Y | Hue on cotton |
|---|---|---|---|---|---|
| 71 | ![2,5-disulfophenyl] | H | 2 | $CH=CH_2$ | yellow |
| 72 | ![2,5-disulfophenyl] | $CH_3$ | 2 | $C_2H_4OCOCH_3$ | yellow |

TABLE 5-continued

| Ex. no. | D | E | m | Y | Hue on cotton |
|---|---|---|---|---|---|
| 73 | 2,5-disulfophenyl (SO₃H at 2, HO₃S at 5) | H | 2 | $C_2H_4OCOCH_3$ | yellow |
| 74 | 2,5-disulfophenyl | H | 2 | $C_2H_4Cl$ | yellow |
| 75 | 6-methyl-naphthalene-1,3,7-trisulfonic acid residue | H | 2 | $C_2H_4OCOCH_3$ | yellow |
| 76 | 6-methyl-naphthalene-1,3,7-trisulfonic acid residue | $CH_3$ | 2 | $C_2H_4OCOCH_3$ | yellow |
| 77 | 6-methyl-naphthalene-1,3,7-trisulfonic acid residue (alt. isomer) | H | 2 | $CH=CH_2$ | yellow |
| 78 | 6-methyl-naphthalene-1,3,7-trisulfonic acid residue (alt. isomer) | H | 3 | $C_2H_4OCOCH_3$ | yellow |
| 79 | 5-methyl-2,4-disulfophenyl | H | 2 | $C_2H_4OCOCH_3$ | yellow |
| 80 | 5-methyl-2,4-disulfophenyl | H | 2 | $C_2H_4Cl$ | yellow |
| 81 | 4-methyl-2,5-disulfophenyl | H | 2 | $CH=CH_2$ | yellow |

TABLE 5-continued

| Ex. no. | D | E | m | Y | Hue on cotton |
|---|---|---|---|---|---|
| 82 | HO$_3$S–⟨Cl, SO$_3$H⟩ | H | 2 | C$_2$H$_4$OCOCH$_3$ | yellow |
| 83 | HO$_3$S–⟨Cl, SO$_3$H⟩ | CH$_3$ | 2 | C$_2$H$_4$OCOCH$_3$ | yellow |

EXAMPLE 84

0.5 mol of the coupling solution described in Example 1 was subjected to a condensation reaction with 133.5 g (0.5 mol) of 4-(2-chloroethylsulfonyl)-benzoyl chloride at from 0° to 5° C. and at a pH of from 5 to 6. The reaction solution was then clarified by filtration and the dye was isolated by salting out. It is of the formula (free acid)

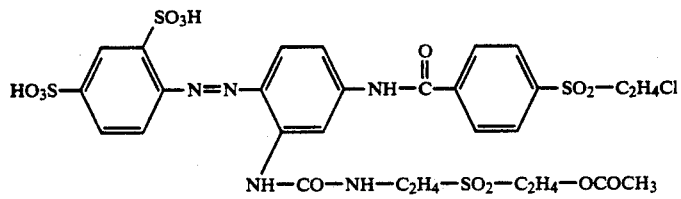

and dyes cotton in a yellow hue.

The dyes of the formula

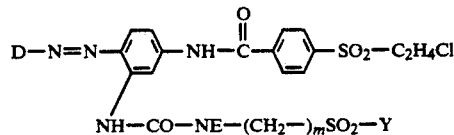

which are shown in Table 6 can be obtained in a similar manner.

TABLE 6

| Ex. no. | D | E | m | Y | Hue on cotton |
|---|---|---|---|---|---|
| 85 | ⟨SO$_3$H / SO$_3$H⟩ | H | 2 | C$_2$H$_4$OCOCH$_3$ | yellow |
| 86 | naphthalene-1,5-disulfonic (SO$_3$H, SO$_3$H) | H | 2 | C$_2$H$_4$OCOCH$_3$ | yellow |
| 87 | naphthalene-1,5-disulfonic (SO$_3$H, SO$_3$H) | H | 2 | C$_2$H$_4$OCOCH$_3$ | yellow |

TABLE 6-continued

| Ex. no. | D | E | m | Y | Hue on cotton |
|---|---|---|---|---|---|
| 88 | 4-SO₃H, 6-SO₃H, 7-CH₃ naphthalene-2-sulfonic acid (SO₃H at 1, HO₃S at 6, CH₃ at 7, SO₃H at 3) | H | 2 | C₂H₄OCOCH₃ | yellow |
| 89 | naphthalene with SO₃H, HO₃S, CH₃, SO₃H substituents | CH₃ | 2 | C₂H₄OCOCH₃ | yellow |
| 90 | naphthalene with SO₃H, HO₃S, CH₃, SO₃H substituents | H | 2 | CH=CH₂ | yellow |
| 91 | naphthalene with SO₃H, HO₃S, CH₃, SO₃H substituents | H | 2 | C₂H₄OCOCH₃ | yellow |
| 92 | benzene with SO₃H, H₃C, SO₃H substituents | H | 2 | C₂H₄OCOCH₃ | yellow |
| 93 | benzene with Cl, HO₃S, SO₃H substituents | H | 2 | C₂H₄OCOCH₃ | yellow |

EXAMPLE 94

126.5 g (0.5 mol) of aniline-2,4-disulfonic acid were diazotized in 500 ml of water containing hydrochloric acid, and the product was added to a solution of 183.5 g (0.5 mol) of the compound of the formula

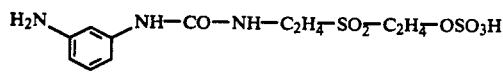

in 500 ml of water. The coupling reaction was carried out at from 0° to 50° C. and at a pH of 3 by adding 2 N sodium hydroxide solution. Thereafter, 84.3 g (0.5 mol) of 2,4,6-trifluoro-5-chloropyrimidine were added to the coupling solution and, for condensation, the temperature was kept at from 0° to 5° C. and at a pH from 6 to 7 by adding 2 N sodium hydroxide solution. The resulting dye solution was clarified by filtration and the reactive dye of the formula (free acid)

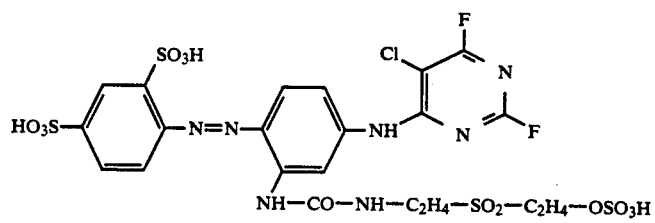

was isolated by spray drying. It dyes cotton in a yellow hue.

The dyes of the formula which are shown in Table 7 can be obtained in a similar manner.
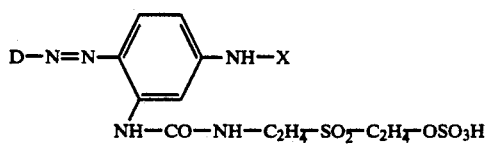
TABLE 7
| Ex. no. | D | X | Hue on cotton |
|---|---|---|---|
| 95 | 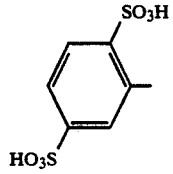 | 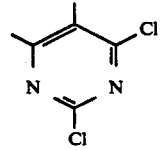 | yellow |
| 96 | 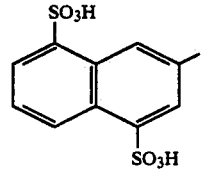 | 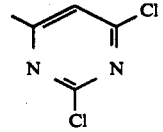 | yellow |
| 97 | 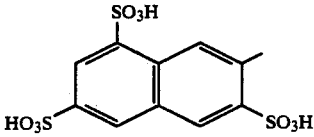 | 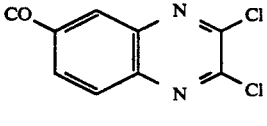 | yellow |
| 98 | 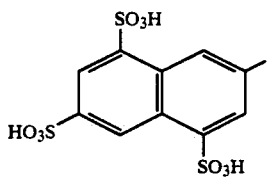 | 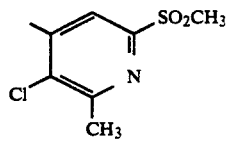 | yellow |
| 99 | 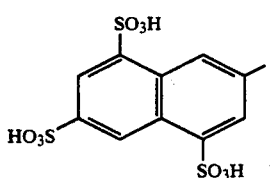 | 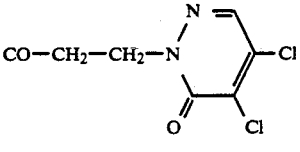 | yellow |
| 100 | 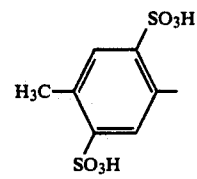 | 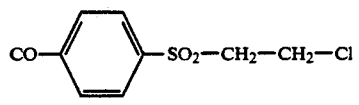 | yellow |
| 101 | 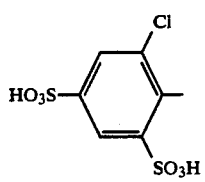 | CO—CBr=CH$_2$ | yellow |
| 102 | 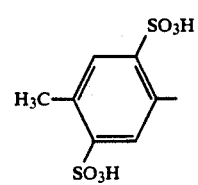 | CO—CH=CH$_2$<br>   Br    Br | yellow |

TABLE 7-continued

| Ex. no. | D | X | Hue on cotton |
|---|---|---|---|
| 103 | 4-methyl-benzene-1,3-disulfonic acid (SO₃H at 3, HO₃S at 5, CH₃ at 1) | CO—CH₂—CH₂—Cl | yellow |
| 104 | 4-methyl-benzene-1,3-disulfonic acid | CO—C₆H₄—SO₂—CH₂—CH=CH₂ (para) | yellow |
| 105 | 4-methyl-benzene-1,3-disulfonic acid | 2-chloro-6-methyl-4-phenyl-3,5-dicyanopyridine linkage | yellow |
| 106 | 4-methyl-benzene-1,3-disulfonic acid | CO—C₆H₄—(4,6-dichloro-1,3,5-triazin-2-yl) (meta) | yellow |
| 107 | naphthalene-1,5-disulfonic acid (3-methyl) | SO₂—(2-chlorobenzoxazol-5-yl) | yellow |
| 108 | naphthalene-1,5-disulfonic acid (3-methyl) | SO₂—(2,4-dichloroquinolin-6-yl) | yellow |
| 109 | 5-methyl-benzene-2,4-disulfonic acid (H₃C, SO₃H, SO₃H) | CO—C₆H₄—(2,3-dichloroquinoxalin-yl) | yellow |
| 110 | 3-chloro-benzene-1,4(?)-disulfonic acid (Cl, HO₃S, SO₃H) | CO—C(Cl)=CH—Cl | yellow |

EXAMPLE 111

25.3 g (0.1 mol) of aniline-2,4-disulfonic acid were diazotized in 100 ml of water containing hydrochloric acid, and a solution of 22.3 g (0.1 mol) of 1-aminonaphthalene-6-sulfonic acid in 100 ml of water was added. The coupling reaction was carried out at from 0° to 50° C. and at a pH of from 3.5 to 4.0 by means of 2 N potassium bicarbonate solution. The resulting azo compound was again diazotized in a solution containing hydrochloric acid, and a suspension of 32.9 g (0.1 mol) of the compound of the formula

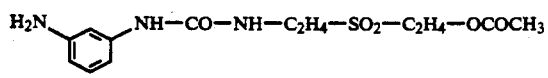

in 150 ml of water was added. The second coupling reaction was carried out at from 10° to 150° C. and at a pH of 3 to 4. The resulting solution of the disazo dye was cooled to 0°–5° C. and subjected to a condensation reaction at this temperature with 18.5 g (0.1 mol) of cyanuric chloride at a pH of 5.5. Thereafter, the reaction solution was clarified by filtration and reacted with 17.3 g (0.1 mol) of aniline-3-sulfonic acid at from 40° to 45° C. and at a pH of 6. The resulting reactive dye could be isolated by salting out by means of potassium chloride. It is of the formula (free acid)

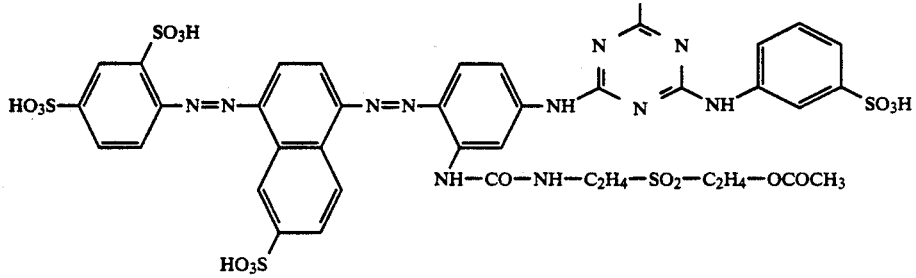

($\lambda_{max}$ = 480 nm)

and dyes cotton in a brown hue.

The dyes of the formula

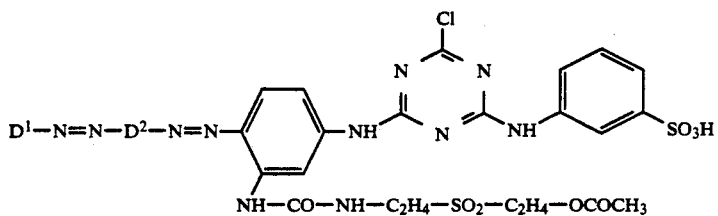

which are shown in Table 8 can be obtained in a similar manner.

TABLE 8

| Ex. no. | D¹ | D² | $\lambda_{max}$ [nm] | Hue on cotton |
|---|---|---|---|---|
| 112 | 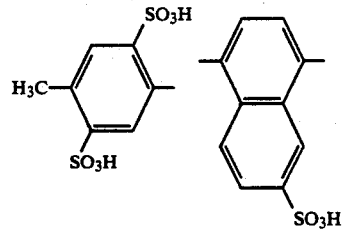 | | 476 | brown |
| 113 | 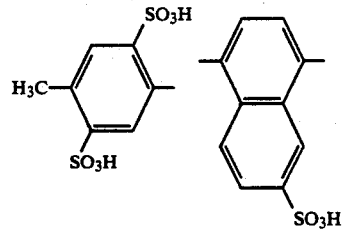 | | 477 | brown |
| 114 | 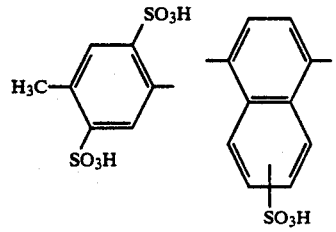 | | 481 | brown |
| 115 | 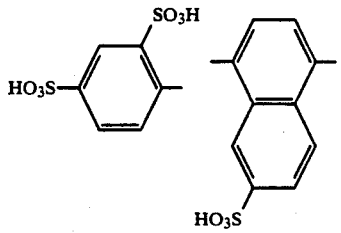 | | 480 | brown |

EXAMPLE 116

26.7 9 (0.1 mol) of 4-toluidine-2,5-disulfonic acid were diazotized in 100 ml of water containing hydrochloric acid, and a suspension of 32.9 g (0.1 mol) of the compound of the formula

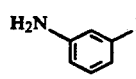

in 150 ml of water was added. The coupling reaction was carried out at from 0° to 5° C. and at a pH of from 3 to 3.5 by means of 2 N potassium bicarbonate solution. The azo compound formed was again diazotized in a solution containing hydrochloric acid and the product was once again reacted with a suspension of 32.9 g (0.1 mol) of the above coupling component in 150 ml of water. The second coupling reaction was carried out at from 0° to 5° C. and at a pH of from 3.5 to 4. The resulting disazo dye was then subjected to a condensation reaction with 20.3 g (0.11 mol) of cyanuric chloride at a pH of 5.5. After the end of the reaction, the excess cyanuric chloride was filtered off, 17.3 g (0.1 mol) of aniline-3-sulfonic acid were added to the filtrate and the mixture was heated to 40°–450° C. and brought to a pH of 6. The resulting reactive dye was salted out with potassium chloride. It is of the formula (free acid)

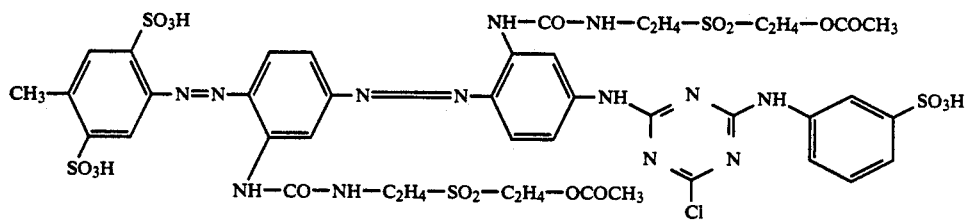

($\lambda_{max}$ = 452 nm)

and dyes cotton in a yellowish brown hue.

The dyes of the formula

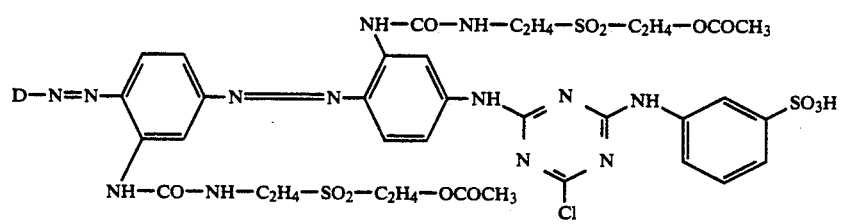

which are shown in Table 9 can be obtained in a similar manner.

TABLE 9

| Ex. no. | D | Hue on cotton |
|---|---|---|
| 117 | (benzene with SO₃H, HO₃S substituents) | yellowish brown |
| 118 | (benzene with H₃CO, SO₃H substituents) | brown |
| 119 | (benzene with SO₃H, HO₃S, CH₃ substituents) | brown |
| 120 | (benzene with H₃C, SO₃H substituents) | brown |
| 121 | (naphthalene with SO₃H, HO₃S, SO₃H, CH₃ substituents) | brown |
| 122 | (naphthalene with SO₃H, HO₃S, SO₃H, CH₃ substituents) | brown |
| 123 | (naphthalene with SO₃H, SO₃H, CH₃ substituents) | brown |

TABLE 9-continued

| Ex. no. | D | Hue on cotton |
|---|---|---|
| 124 | | yellowish brown |

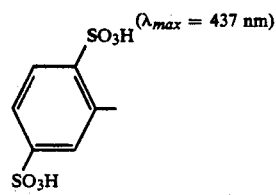
($\lambda_{max}$ = 437 nm)

EXAMPLE 125

0.1 mol of the monoazo compound described in Example 116 was diazotized in a solution containing hydrochloric acid at from 0° to 5° C., and a solution of 22.3 g (3.1 mol) of 1-aminonaphthalene-6-sulfonic acid in 100 ml of water was added. The coupling reaction was carried out at a pH of from 3 to 4 by means of 2 N potassium bicarbonate solution. The resulting disazo compound was subjected to a condensation reaction first with 18.4 g (0.1 mol) of cyanuric chloride at a pH of 5.5 and then with 17.3 g (0.1 mol) of aniline-3-sulfonic acid at from 40° to 45° C. and at a pH of 6. The reactive dye of the formula (free acid)

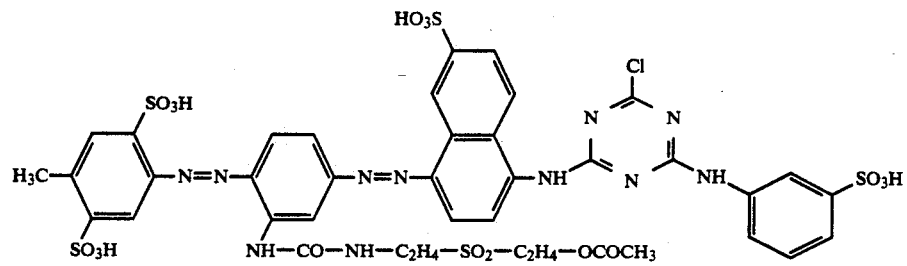

was salted out with potassium chloride. It dyes cotton in a brown hue.

The dyes of the formula

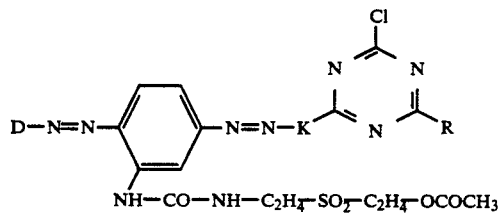

which are shown in Table 10 can be obtained in a similar manner.

TABLE 10

| Ex. no. | D | K | R | Hue on cotton |
|---|---|---|---|---|
| 126 | 2,5-disulfophenyl | 6-sulfo-naphthalene (1,5-diyl with NH) | 3-sulfoanilino | brown |
| 127 | 2-methoxy-5-sulfophenyl | 8-sulfo-naphthalene (1,5-diyl with NH) | 3-sulfoanilino | brown |
| 128 | 3,6,8-trisulfo-2-methyl-naphthyl | 2-sulfo-4-amino-phenyl | 3-sulfoanilino | brown |
| 129 | 3,6,8-trisulfo-2-methyl-naphthyl | 2-methyl-4-amino-phenyl | 3-sulfoanilino | brown |

TABLE 10-continued

| Ex. no. | D | K | R | Hue on cotton |
|---|---|---|---|---|
| 130 | naphthalene-1,3,5-trisulfonic acid with methyl (SO₃H positions shown) | 4-methyl-naphthyl-1-amine with SO₃H | N-methylaniline (CH₃, phenyl) | brown |
| 131 | naphthalene-1,5-disulfonic acid with methyl | 4-methyl-naphthyl-1-amine with SO₃H | N-methylaniline | brown |

EXAMPLE 132

0.1 mol of the disazo dye solution described in Example 111 was subjected to a condensation reaction with 22 g (0.1 mol) of tetrachloropyrimidine at from 30° to 45° C. and at a pH of from 6 to 7. Thereafter, the solution was clarified by filtration and the dye was isolated by spray drying. It is of the formula (free acid)

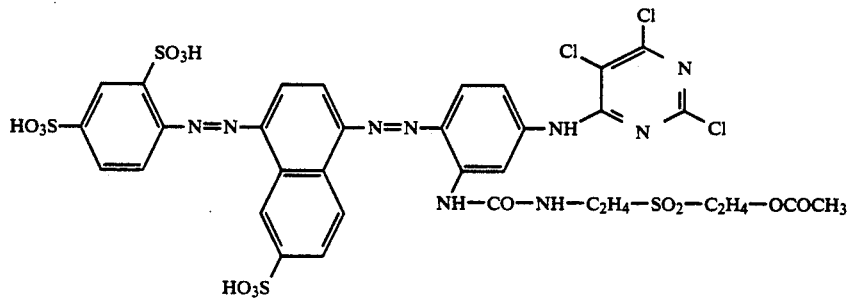

and dyes cotton in a brown hue.

The dyes of the formula $$D^1-N=N-D^2-N=N-K-NH-X$$

which are shown in Table 11 can be obtained in a similar manner.

| Ex. no. | D¹ | D² | K | X | Hue on cotton |
|---|---|---|---|---|---|
| 132 | 2,5-disulfo-4-methylphenyl (SO₃H, CH₃, SO₃H) | 2,5-dimethylphenyl–NH–CO–NH–C₂H₄–SO₂–C₂H₄–OCOCH₃ | naphthalene-SO₃H | 5-chloro-6-fluoro-2-methylpyrimidin-4-yl (F, Cl, N, N, F) | brown |
| 133 | 3-methyl-6,8-disulfonaphth-2-yl | 2,5-dimethylphenyl–NH–CO–NH–C₂H₄–SO₂–CH=CH₂ | 2,5-dichloro-1,4-phenylenediamine with OH | dichloroquinoxaline | brown |
| 134 | 3-methyl-5,8-disulfonaphth-1-yl | 2,5-dimethylphenyl–NH–CO–NH–C₂H₄–SO₂–C₂H₄–OSO₃H | naphthalene-SO₃H | 5-fluoro-6-chloro-2-methylpyrimidin-4-yl | brown |
| 135 | 3-methyl-1,5,7-trisulfonaphthyl | naphthalene-SO₃H | 2,5-dimethylphenyl–NH–CO–NH–C₂H₄–SO₂–C₂H₄–OCOCH₃ | 5,6-dichloro-2-methylpyrimidin-4-yl | brown |

-continued

| Ex. no. | D¹ | D² | K | X | Hue on cotton |
|---|---|---|---|---|---|
| 136 | naphthalene with SO₃H, SO₃H, HO₃S, CH₃ substituents | naphthalene-SO₃H | dimethylphenyl—NH—CO—NH—C₂H₄—SO₂—C₂H₄—OSO₃H | 2,3-dichloroquinoxaline with OH substituent | brown |
| 137 | benzene with CH₃, H₃CO, HO₃S substituents | naphthalene-SO₃H | dimethylphenyl—NH—CO—NH—C₂H₄—SO₂—C₂H₄—OCOCH₃ | 4,5-dichloro-pyridazinone with —CO₂H₄— group on N | brown |
| 138 | benzene with SO₃H, HO₃S, CH₃ substituents | dimethylphenyl—NH—CO—NH—C₂H₄—SO₂—C₂H₄—OCOCH₃ | dimethylphenyl—NH—CO—NH—C₂H₄—SO₂—C₂H₄—OCOCH₃ | 4,5-dichloro-pyridazinone with —CO—CH₂—CH₂— group on N | yellowish brown |
| 139 | benzene with SO₃H, H₃C, SO₃H substituents | dimethylphenyl—NH—CO—NH—C₂H₄—SO₂—C₂H₄—OCOCH₃ | dimethylphenyl—NH—CO—NH—C₂H₄—SO₂—C₂H₄—OCOCH₃ | trichloropyrimidine with CH₃ | yellowish brown |

-continued

| Ex. no. | D¹ | D² | K | X | Hue on cotton |
|---|---|---|---|---|---|
| 140 | (methyl-naphthalene with 3 SO₃H groups) | (methylnaphthalene-SO₃H) | (dimethylphenyl)–NH–CO–NH–C₂H₄–SO₂–C₂H₄–OCOCH₃ | (phenyl with CO– and –SO₂–C₂H₄Cl) | brown |
| 141 | (chloro-methyl-benzene with 2 SO₃H) | (methylnaphthalene-SO₃H) | (dimethylphenyl)–NH–CO–NH–C₂H₄–SO₂–C₂H₄–OCOCH₃ | CO–C(Br)=CH₂ | brown |
| 142 | (methylbenzene with 2 SO₃H) | (methylphenyl)–NH–CO–NH–C₂H₄–SO₂–C₂H₄–OCOCH₃ | (dimethylnaphthalene-SO₃H) | CO–CH₂–CH₂–Cl | brown |
| 143 | (methyl-naphthalene with 2 SO₃H) | (methylphenyl)–NH–CO–NH–C₂H₄–SO₂–CH=CH₂ | (methylphenyl-SO₃H) | (phenyl with CO– and –SO₂–C₂H₄Cl) | brown |
| 144 | (methyl-naphthalene with 3 SO₃H) | (methylphenyl)–NH–CO–NH–C₂H₄–SO₂–C₂H₄Cl | (methylphenyl-OCH₃) | COCH₂–CH₂–N–N=CH–C(F)=C(Cl)–C(=O) (pyridazinone) | brown |

We claim:
1. A-reactive dye of the formula I

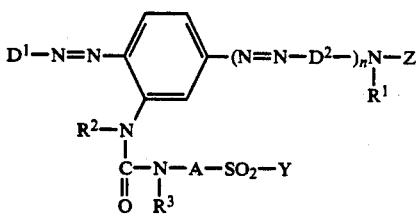

where
n is 0 or 1,
$R^1$, $R^2$ and $R^3$ are identical or different and, independently of one another, are each hydrogen, $C_1$-$C_4$-alkyl or phenyl,
A is $C_2$-$C_8$-alkylene which may be interrupted by from 1 to 3 oxygen atoms, imino groups or $C_1$-$C_4$-alkylimino groups,
Y is vinyl or a radical of the formula —$CH_2$—$CH_2$—Q, where
Q is a group which can be eliminated under alkaline reaction conditions,
$D^1$ is phenyl or naphthyl, where these radicals may be monosubstituted or polysubstituted by hydroxysulfonyl, carboxyl, $C_1$-$C_4$-alkoxycarbonyl, cyano, $C_1$-$C_4$-alkyl, $C_1$-$C_4$-alkoxy, halogen, nitro or vinylsulfonyl or monosubstituted by unsubstituted or substituted phenylazo or by unsubstituted or substituted naphthylazo,
$D^2$ is unsubstituted or substituted phenylene or unsubstituted or substituted naphthylene and
Z is a reactive radical,
with the proviso that
a) n is zero when $D^1$ is substituted by unsubstituted or substituted phenylazo or by unsubstituted or substituted naphthylazo, and
b) the reactive radical Z is not derived from the triazine series when n is zero and $D^1$ is dihydroxysulfonylphenyl or trihydroxysulfonylnaphthyl.

2. A reactive dye as claimed in claim 1, wherein
n is zero,
$R^1$, $R^2$ and $R^3$ are each hydrogen,
A is $C_2$-$C_4$-alkylene which may be interrupted by an oxygen atom and
$D^1$ is phenyl or naphthyl, where these radicals are mono-substituted to trisubstituted by hydroxysulfonyl.

3. A reactive dye as claimed in claim 1, wherein Z is a radical from the pyrazine, pyrimidine, quinoxaline, triazine, vinylsulfonyl or acryloyl series.

4. A method of dyeing or printing organic substrates containing hydroxyl groups or nitrogen atoms comprising applying thereto a reactive dye as claimed in claim 1.

* * * * *